(12) United States Patent
Nakano et al.

(10) Patent No.: US 6,746,125 B2
(45) Date of Patent: Jun. 8, 2004

(54) PROJECTOR

(75) Inventors: Hirohisa Nakano, Matsumoto (JP);
Nobuo Watanabe, Shiojiri (JP);
Haruyoshi Yamada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/961,061

(22) Filed: Sep. 24, 2001

(65) Prior Publication Data

US 2002/0041362 A1 Apr. 11, 2002

(30) Foreign Application Priority Data

Sep. 27, 2000 (JP) ........................................ 2000-294686

(51) Int. Cl.⁷ .................... G03B 21/18; G03B 21/26; G03B 21/22
(52) U.S. Cl. ........................ 353/61; 353/57; 353/119
(58) Field of Search ........................................... 353/119

(56) References Cited

U.S. PATENT DOCUMENTS 5,669,688 A    9/1997  Baar et al.
6,111,630 A    8/2000  Watanuki et al.
6,254,238 B1 * 7/2001  Takamatsu .................... 353/61
6,334,686 B1 * 1/2002  Shiraishi et al. ............ 353/119
6,497,489 B1 * 12/2002 Li et al. ....................... 353/61

FOREIGN PATENT DOCUMENTS

| EP | 0 773 691 A2 | 5/1997 | |
| EP | 0 829 750 A2 | 3/1998 | |
| EP | 0 866 359 A1 | 9/1998 | |
| EP | 1102117 A1 * | 5/2000 | ........... G03B/21/16 |
| EP | 1 102 117 A1 | 5/2001 | |
| JP | 8-304739 A | 11/1996 | |

* cited by examiner

*Primary Examiner*—Russell Adams
*Assistant Examiner*—Andrew Sever
(74) *Attorney, Agent, or Firm*—Oliff & Berridge, PLC

(57) ABSTRACT

A centrifugal fan (50) is provided around the light source of the projector and an exhaust duct (51) is connected to the centrifugal fan with at least one of bent portion (52) for bending exhaust stream from the centrifugal fan being formed on the exhaust duct. Since the centrifugal fan for exhausting air can be disposed at a position remote from the exhaust hole, the noise generated from the projector can be reduced even when the size of the cooling fan is increased.

10 Claims, 9 Drawing Sheets

F I G. 6
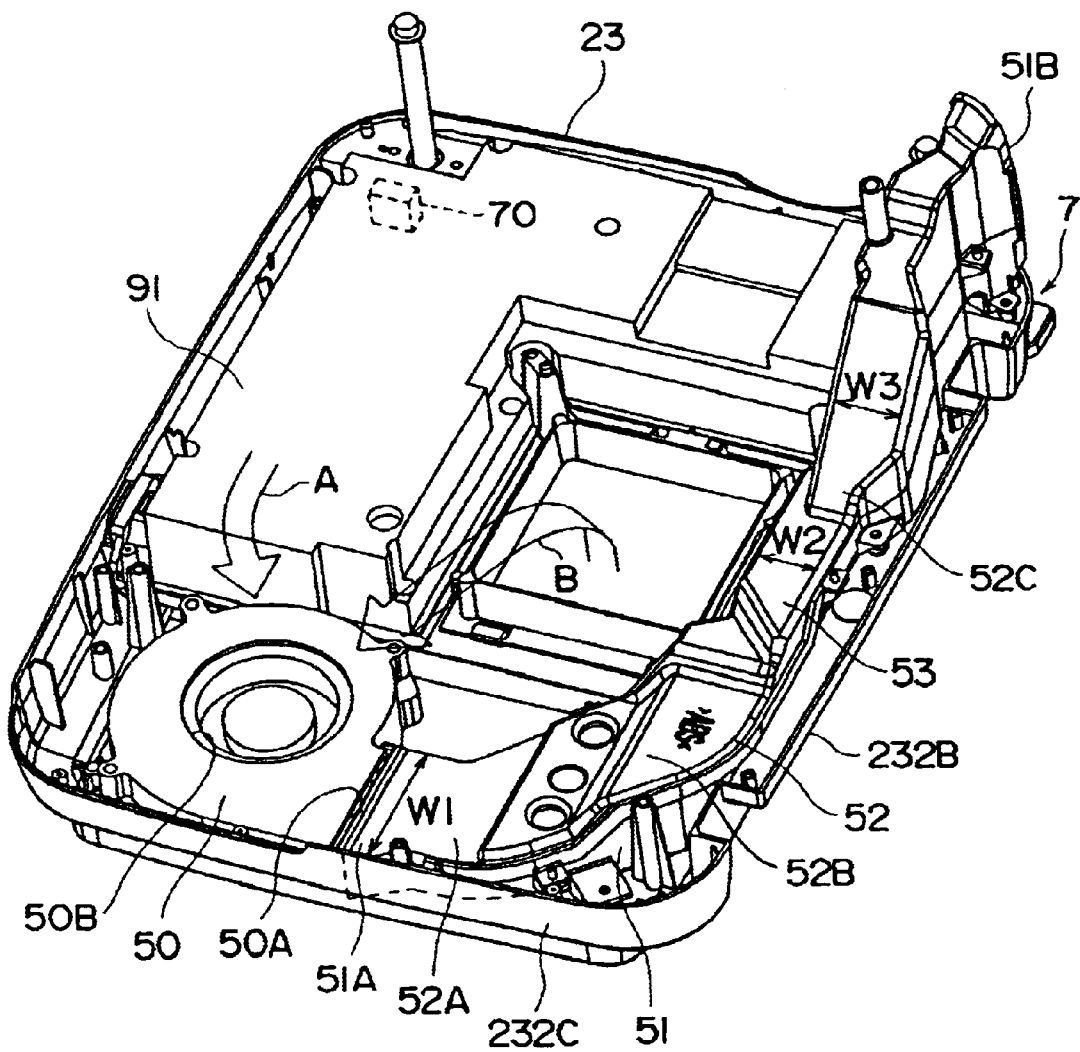

PROJECTOR

BACKGROUND OF THE INVENTION

1. Field of the Invention

The present invention relates to a projector having a light source, an electric optical device for modulating a light beam irradiated from the light source in accordance with image information to form an optical image, a projecting optical system for enlarging and projecting the optical image formed by the electric optical device, and a casing for accommodating these components.

2. Description of Related Art

Conventionally, a projector having a light source, an electric optical device for modulating a light beam irradiated from the light source in accordance with image information to form an optical image, a projecting optical system for enlarging and projecting the optical image formed by the electric optical device, and a casing for accommodating these components has been used.

Such projectors have been widely used for multimedia presentation in a meeting, scientific society, exhibition etc. Accordingly, in order to obtain vivid projected image by the projector, it is required for the light source to increase luminance thereof.

In order to enhance the luminance of the light source of the projector, cooling efficiency of optical components including the electric optical device has to be improved for preventing overheat in the inside of the device.

Accordingly, a suction fan and an exhaust fan provided in the projector for cooling is enlarged to promote the circulation of the cooling air, thus enhancing the cooling efficiency.

However, following problems accompanies in the above arrangement where the fan is enlarged in accordance with increasing the luminance of the light source for enhancing the cooling efficiency. When the size of the fan is increased to promote circulation of the cooling air inside the device, flow rate and speed of the cooling air are naturally increased, which causes jet noise in colliding with the components constituting the projector, so that noise is likely to be generated in using the projector.

Especially, when the exhaust fan is provided along the exterior case of the projector, size increase of the fan results in increase in the sound of the exhaust fan itself as well as the jet noise, thus further increasing the noise.

Further, in the conventional projector, since the cooling air is exhausted from a backside of the device opposite to the portion provided with the projecting optical system, hot wind is blown to the audience observing the projected image, which is annoying to the audience. When the size of the exhaust fan is enlarged, the above tendency is expected to be strengthened.

SUMMARY OF THE INVENTION

An object of the present invention is to respond to improving cooling efficiency inside the device in accordance with increase in luminance of the light source, to secure sufficient silence and to prevent annoyance to the audience. Specifically, the present invention is arranged as follows.

A projector according to the present invention includes: a light source; an electric optical device for modulating a light irradiated from the light source in accordance with an image information to form an optical image; a projecting optical system for enlarging and projecting the optical image formed by the electric optical device; a casing for accommodating the light source, the electric optical device and the projecting optical system; a centrifugal fan disposed around the light source for inhaling an air by a rotation thereof and for discharging the air in tangential direction of the rotation; an exhaust duct accommodated in the casing, the exhaust duct having a first end connected to an air discharge hole of the centrifugal fan and a second end connected to an exhaust hole formed at the front of the casing for the projecting optical system to be exposed; and at least one bent portion formed on the exhaust duct to bend an exhaust stream discharged from the centrifugal fan.

As the centrifugal fan, a fan for inhaling air from a rotary surface of a fan and discharging in tangential direction of the rotation of the vane, which may be a sirocco fan etc. The centrifugal fan inhales air with a large opening area and discharges the air with a small opening area, so that the discharge pressure of the discharged air can be magnified.

According to the above arrangement, since the exhaust hole formed on the casing and the centrifugal fan for exhausting the air are connected through the exhaust duct, the centrifugal fan for exhausting the air can be located remote from the exhaust hole, so that the noise generated by the projector can be reduced even when the size of the cooling fan is increased.

Since the exhaust air is discharged from the exhaust hole through the inside of the exhaust duct, the exhaust stream can be prevented from colliding with components of the projector, thereby restraining generation of jet noise and improving silence of the projector.

Since the bent portion is formed on the exhaust duct, the noise of the exhaust fan can be prevented from being leaked out of the exhaust hole, thereby further improving silence of the projector.

Since the centrifugal fan such as a sirocco fan is used as the exhausting fan, the air can be discharged with a high discharge pressure, so that the air can be sufficiently discharged even when the length of the exhaust duct from the air discharge hole of the centrifugal fan to the exhaust hole of the casing is lengthened.

Since the exhaust hole is provided on the front side of the projector, the hot wind does not blow out from the backside of the projector, so that audience observing the projected image of the projector does not feel annoyed.

In the present invention, the casing may preferably be approximately rectangular solid, and the exhaust duct may preferably extend along at least two sides of the inside of the casing.

According to the above arrangement, since the exhaust duct can be located on the outermost portion of the case and the respective optical components can be efficiently disposed inside the case, thereby improving accommodation efficiency and preventing increase in size of the device.

In the present invention, the cross section of the exhaust duct may preferably have a larger diameter along the inside of the casing than the diameter in a direction orthogonal with the inside of the casing.

According to the above arrangement, the exhaust efficiency is not impaired, and since the diameter in one direction is small, the optical components can be disposed at the spare space, thereby improving accommodation efficiency and preventing increase in device size.

In the present invention, the bending angle of the bent portion may preferably be 45 degrees or less.

According to the above arrangement, turbulence can be restrained and the exhaust stream can smoothly flow even at the bent portion.

In the present invention, an optical component case for accommodating optical components including the light source may preferably be provided, the exhaust duct being disposed along the optical component case, and an intake duct provided between the optical component case and the exhaust duct to introduce components inside the optical component case to an air intake of the centrifugal fan.

According to the above arrangement, the after-cooling air of the portion where the heat is the most likely to be accumulated can be guided to the air intake of the centrifugal fan.

In the present invention, an opening for introducing the cooling air formed on a side of the optical component case opposite to a side along with the intake duct may preferably be provided, a disposition of the opening corresponds to a disposition of the optical components accommodated in the optical component case.

According to the above arrangement, since the cooling air from above the optical component case can be introduced to the intake duct, the air flow inside the optical component casing can be made smooth, thereby efficiently cooling the components.

In the present invention, an exhaust opening for discharging the air having cooled the optical components may preferably be formed on the optical component case, a disposition of the exhaust opening corresponds to a disposition of the light source accommodated therein, the centrifugal fan may preferably be disposed on the exhaust opening with the air intake of the centrifugal fan being faced, and a partition member for dividing an after-cooling air transferred from the light source and an after-cooling air transferred from the other optical components may preferably be provided to the exhaust opening.

According to the above arrangement, the after-cooling air of different portions in the optical component case can be securely guided to the air intake of the centrifugal fan by the partition members.

In the present invention, a light source partition for dividing the after-cooling air transferred from a light-irradiating side of the light source and the after-cooling air transferred from the backside of the light source may preferably be provided to the exhaust opening.

According to the above arrangement, the after-cooling air from the light-irradiating side and backside of the light source can be securely introduced to the air intake of the centrifugal fan by the partition members.

In the present invention, the intake duct may preferably be constructed by combining a recess formed on the outside of the optical component case and a lid member shutting the recess, the lid member and the partition member being integrated.

According to the above arrangement, the lid member and the partition members do not have to be manufactured as separate components, thereby omitting work and components required therefor.

BRIEF DESCRIPTION OF THE DRAWINGS

FIG. 6 is a perspective view showing a cooling mechanism of the projector of the aforesaid embodiment;

DETAILED DESCRIPTION OF PREFERRED EMBODIMENT(S)

An embodiment of the present invention will be described below with reference to attached drawings.

[1. Primary Arrangement of Projector]

Figure 1:
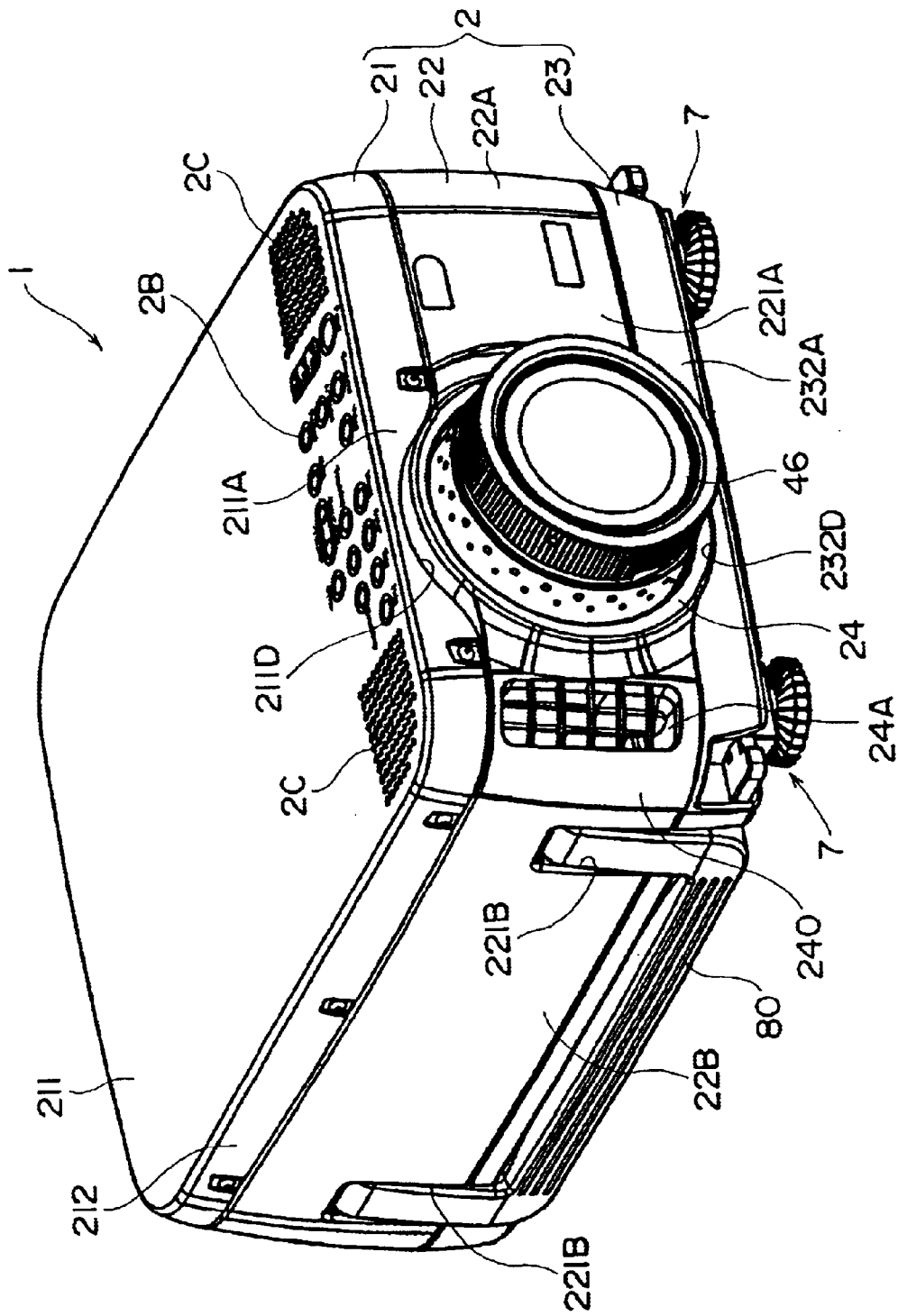
FIG. 1 is an entire perspective seen from above showing a projector according to an embodiment of the present invention.
Figure 2:
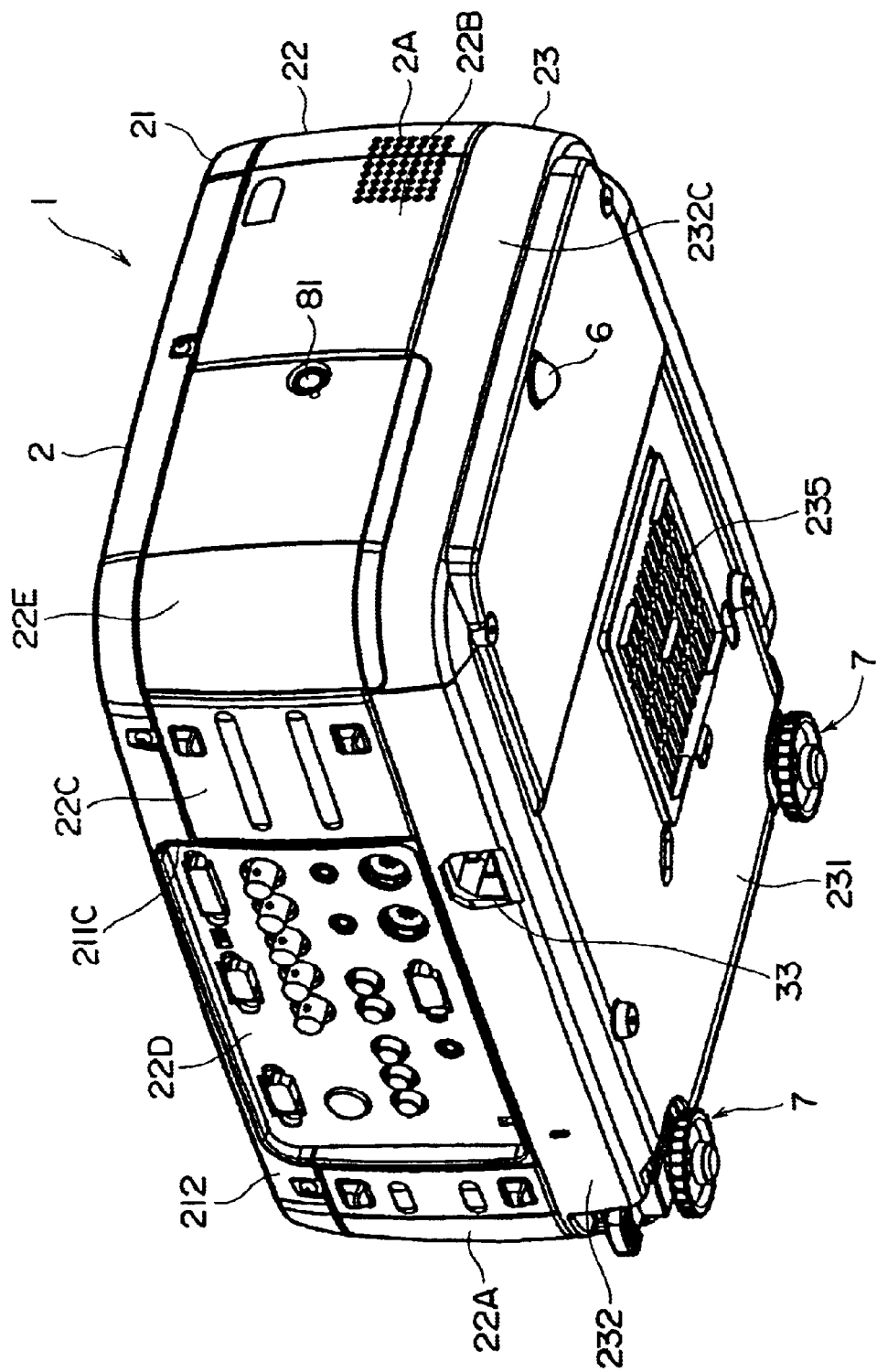
FIG. 2 is an entire perspective showing the projector according to the aforesaid embodiment seen from below.
Figure 3:
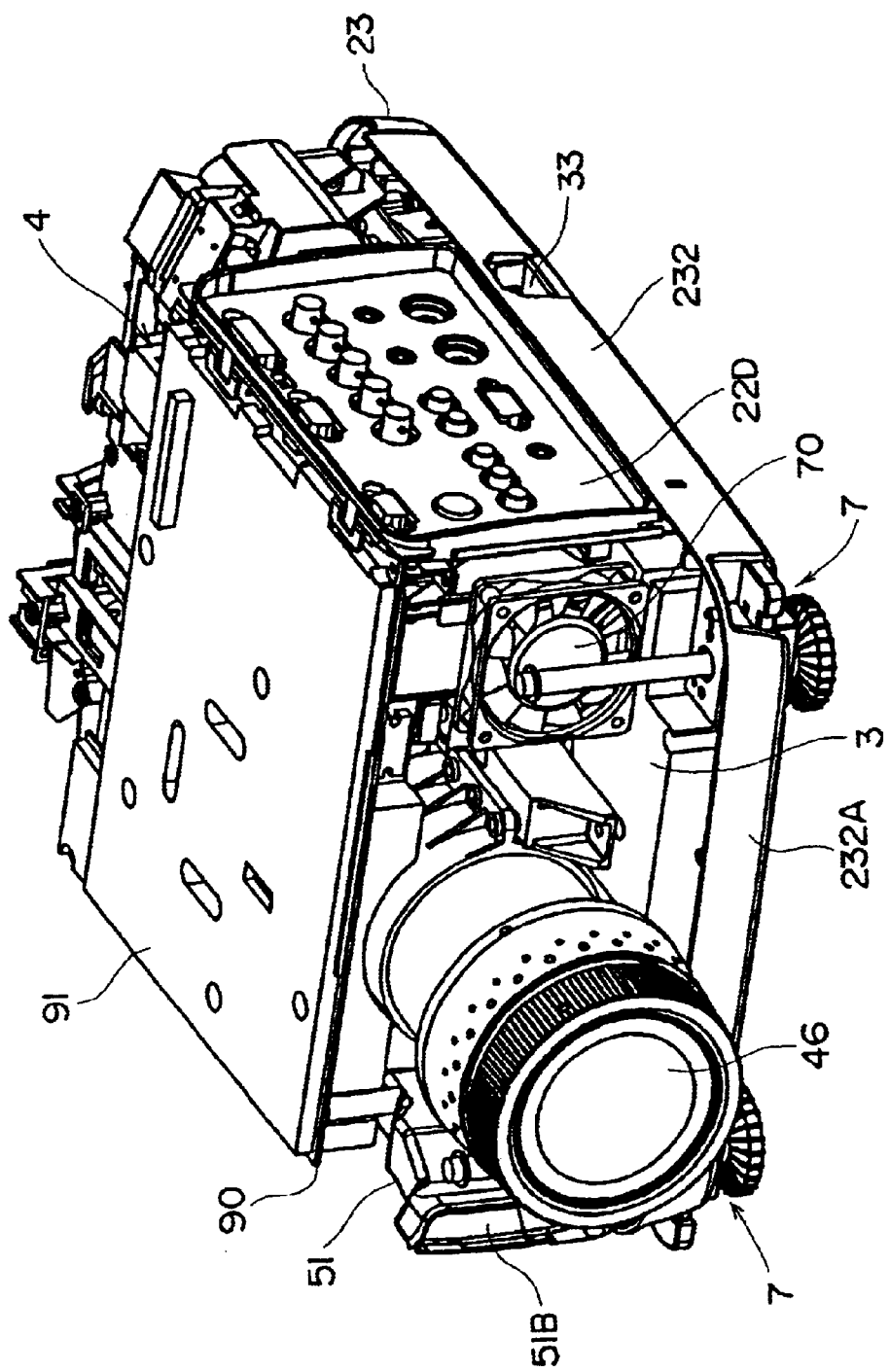
FIG. 3 is an entire perspective view showing an inside of the projector of the aforesaid embodiment.

In FIGS. 1 to 3, a projector 1 has an exterior case 2, a power supply unit 3 accommodated in the exterior case 2, and an optical unit 4 of planarly L-shape disposed in the exterior case 2, the entirety of the projector 1 being approximate rectangular solid.

The exterior case 2 includes a sheet-metal upper case 21, a middle case 22 made of bent aluminum or steel plate, and a lower case 23 made of die casting such as magnesium. The cases 21, 22 and 23 are mutually fixed by a screw.

The upper case 21 is formed of an upper portion 211 and a side portion 212 disposed around the upper portion 211, which is, for instance, shaped by a press using a die. A circular hole 211D corresponding to a lens attachment frame 24 for attaching a projector lens 46 is provided to a front portion 211A side of the side portion 212, the neighborhood of the circular hole 211D being curved inwardly by drawing. A notch 211C (see FIG. 2) is formed on a side orthogonal with the front portion 211A of the side portion 212.

The middle case 22 is, as described above, formed by bending aluminum plates etc., which includes a fist case member 22A and a second case member 22B disposed on both sides of the projector lens 46, and a third case member at the back of the first case member 22A. An interface substrate 22D exposing various connectors for an interface is disposed and connected between the first case member 22A and the third case member 22C and an openable and closable lamp cover 22E is provided between the second case member 22B and the third case member 22C.

The respective case members 22A, 22B and 22C have a configuration capable of being combined with the upper case 21 and the lower case 23 by bending the aluminum plates having a predetermined configuration blanked by a press or a machining center.

An opening (not shown) corresponding to the lens attachment frame 24 is formed on opposing sides of the first case member 22A and the second case member 22B on a side of front 221A of the middle case 22. Another opening (not shown) is formed on the front 221A side of the second case member 22B, which opposes an exhaust hole 24A formed on the lens attachment frame 24.

The lens attachment frame 24 is attached to the middle case 22 to form the middle case 22. Incidentally, a cover 240 made of, for instance, plastic, is attached around the exhaust hole 24A.

Handle openings 221B extending from the lower case 23 toward the upper case 21 by a predetermined distance spaced apart with each other are provided to the second case member 22B. A handle 80 is attached to the openings 221B.

As shown in FIG. 2, the lamp cover 22E has a knob 81 such as a screw on the second case member 22B side and is engaged to the peripheral end of the third case member 22C. The knob 81 is screwed to a nut (not shown) formed on the second case member 22B through an E ring. When the knob 81 is rotated to release screwing with the nut, the knob 81 projects to the outside from the lamp cover 22E by the amount being screwed. When the knob 81 is held to slide the lamp cover 22E along the side of the projector 1, the lamp cover 22E can be detached. Incidentally, since the knob 81 is supported by the E ring, the knob 81 is not detached from the lamp cover 22E even after releasing to screw with the nut.

As mentioned above, the lower case 23 is a die-casting of magnesium etc., where an approximately rectangular bottom portion 231 and a side portion 232 around the bottom portion are integrally formed. A reinforcing rib etc. is formed at a predetermined location inside the lower case 23, thereby securing strength of the entire lower case 23.

A height position adjuster 7 for adjusting inclination of the entire projector 1 to adjust position of the projected image is provided on both corners of front side of the bottom portion 231 of the lower case 23. On the other hand, a resin-made foot member 6 (FIG. 2) is fitted to the rear center of the bottom portion 231. A fan cover 235 is attached to the bottom portion 231 of the lower case 23. A circular hole 232D corresponding to the lens attachment frame 24 is provided to a front portion 232A of the lower case 23.

An intake hole 2A for introducing cooling air to the inside, an exhaust hole 24A for exhausting the air after cooling, the multiple holes 2C corresponding to positions of the intake hole 2A, the manipulation switch 2B and the speaker, and the handle opening 221B are provided to the exterior case 2. Incidentally, the cooling air is introduced to the inside from the handle opening 221B.

As shown in FIG. 3, the power unit 3 is composed of a power supply (not shown) disposed on the bottom side in the exterior case 2 and a lamp driving circuit disposed above the power supply. The power supply supplies electric power supplied through a power cable to the lamp driving circuit and a driver board (not shown), which includes an inlet connector 33 for the power cable to be plugged (FIG. 3).

The lamp driving circuit supplies electric power to a light source lamp 411 (FIG. 4) of the optical unit 4.

Figure 4:
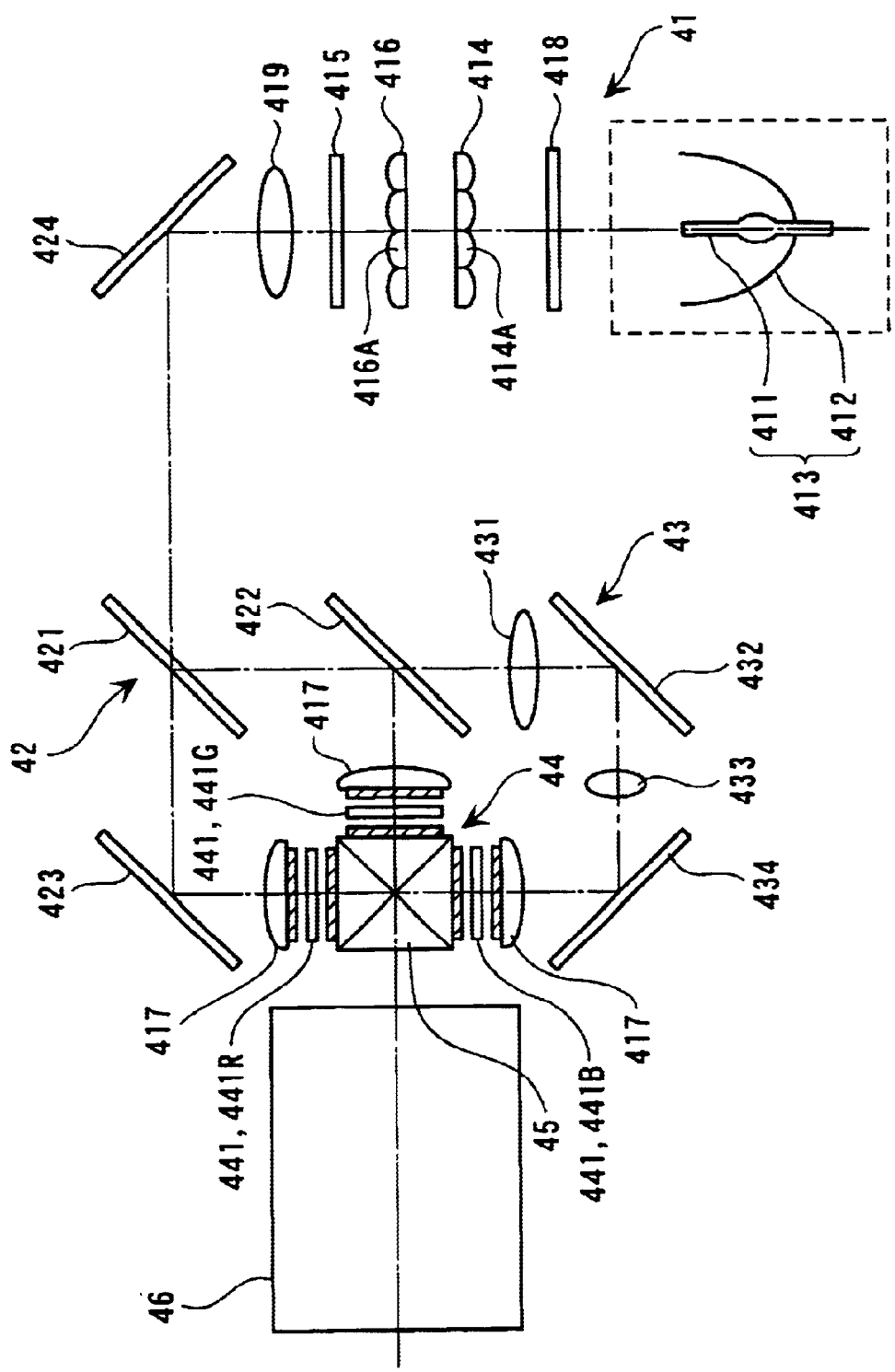
FIG. 4 is a plan view schematically showing respective optical systems of the projector of the aforesaid embodiments.

As shown in FIG. 4, the optical unit 4 optically processes the light beam irradiated from the source lamp 411 to form an optical image corresponding to the image information, which includes an integrator illuminating optical system 41, a color separating optical system 42, a relay optical system 43, an electric optical device 44, a cross dichroic prism 45 as a color synthesizing optical system and a projector lens 46 as a projection optical system.

[2. Detailed Arrangement of Optical System]

In FIG. 4, the integrator illuminating optical system 41 is an optical system for substantially uniformly illuminating the image formation areas of the three liquid crystal panels 441 (respectively represented as liquid crystal panels 441R, 441G and 441B for each color light of red, green and blue), which includes a light source 413, a UV filter 418, a first lens array 414 as a beam splitter, a second lens array 416, a polarization converter 415, a superimposing lens 419, and a reflection mirror 424.

The light source 413 constituting the integrator illuminating optical system 41 has the source lamp 411 as a radial light source for emitting radial light beam and a reflector 412 for reflecting the radial light emitted from the source lamp 411. A halogen lamp, a metal halide lamp, or a high-pressure mercury lamp is often used as the source lamp 411. A parabolic mirror is used as the reflector 412, however, an ellipsoidal mirror and a parallelizing lens (concave lens) may be used.

The first lens array 414 has a matrix arrangement of lenses 414A having substantially rectangular profile viewed from optical axis direction. The respective lenses 414A split the beam emitted from the source lamp 411 and passed through the UV filter 418 into a plurality of sub-beams. The profile of the respective lenses 414A is approximately similar to the configuration of the image formation area of the liquid crystal panel 441. For instance, when the aspect ratio (ratio of horizontal and vertical dimensions) of the liquid crystal panels 441 is 4:3, the aspect ratio of the respective lenses is also set as 4:3.

The second lens array 416 has approximately the same arrangement as the first lens array 414, where the lenses 416A is disposed in matrix. The second lens array 416 focuses the image from the respective lenses 414A of the first lens array 414 onto the liquid crystal panel 441 as well as the superposing lens 419.

The polarization converter 415 is disposed between the second lens array 416 and the superposing lens 419 for converting the light from the second lens array 416 to a single polarized light in order to enhance utilization efficiency of the light in the electric optical device 44.

Specifically, the respective partial light converted into single polarized light by the polarization converter 415 is substantially superposed on the liquid crystal panels 441R, 441G and 441B of the electric optical device 44 by the superposing lens 419. Since the projector using a liquid crystal panel for modulating polarized light can use only single polarized light, approximately half of the light from the source lamp emitting random polarization light cannot be used.

Accordingly, in the projector 1 of the present embodiment, by using the polarization converter 415, all of the emitted light from the source lamp 411 is converted into single polarized light to enhance utilization efficiency of the light in the electric optical device 44. Incidentally, such polarization converter 415 is disclosed in, for instance, Japanese Patent Laid-Open publication No. Hei 8-304739.

The color separating optical system 42 has two dichroic mirrors 421 and 422 and a reflection mirror 423, where the mirrors 421 and 422 separates the plurality of sub-beam irradiated from the integrator illuminating optical system 41 into three color lights of red, green and blue.

The relay optical system 43 includes an incident-side lens 431, a relay lens 433 and a reflection mirrors 432 and 434, which introduces blues light of the color lights separated by the color separating optical system 42 into the liquid crystal panel 441B.

At this time, the blue color light component and the green light component of the light beam irradiated from the integrator illuminating optical system 41 is reflected by the dichroic mirror 421 of the color separating optical system 42 and the red color light component transmits through the dichroic mirror 421. The red color light transmitted through the dichroic mirror 421 is reflected by the reflection mirror 423, which reaches to the liquid crystal panel 441R for red-color through a field lens 417. The field lens 417 converts the respective sub-beam emitted from the second lens array 416 into a light beam parallel to central axis (main beam). The field lenses 417 provided in front of the other liquid crystal panels 441G and 441B function in the same manner.

In the blue light and the green light reflected by the dichroic mirror 421, the green light is reflected by the dichroic mirror 422 to reach the liquid crystal panel 441B for green color through the field lens 417. On the other hand, the blue color transmits through the dichroic mirror 422 to pass the relay optical system 43 and reach the liquid crystal panel 441B for blue light through the field lens 417. Incidentally, the relay optical system 43 is used for the blue color in order to prevent decrease in utilization efficiency of light on account of light diffusion because the length of the optical path of the blue color light is longer than the length of the optical path of the other color lights, in other words, in order to directly transmit the sub-beam incident on the incident-side lens 431 to the field lens 417.

The electric optical device 44 has the liquid crystal panels 441R, 441G and 441B as three optical modulators which, for instance, use a polysilicon TFT as switching element. The color lights separated by the color-separating optical systems 42 is modulated by the three crystal panels 441R, 441G and 441B in accordance with image information to form optical image.

The cross dichroic prism 45 combines the images modulated for respective color lights irradiated from the three liquid crystal panels 441R, 441G and 441B to form a color image. Incidentally, the prism 45 has a dielectric multilayer film for reflecting red light and another dielectric multiplayer film for reflecting blue light along boundaries of the four right-angled prisms, the dielectric multilayers synthesizing three color lights. The color image combined by the prism 45 is irradiated from the projection lens 46 and is enlarged and projected on a screen.

Figure 5:
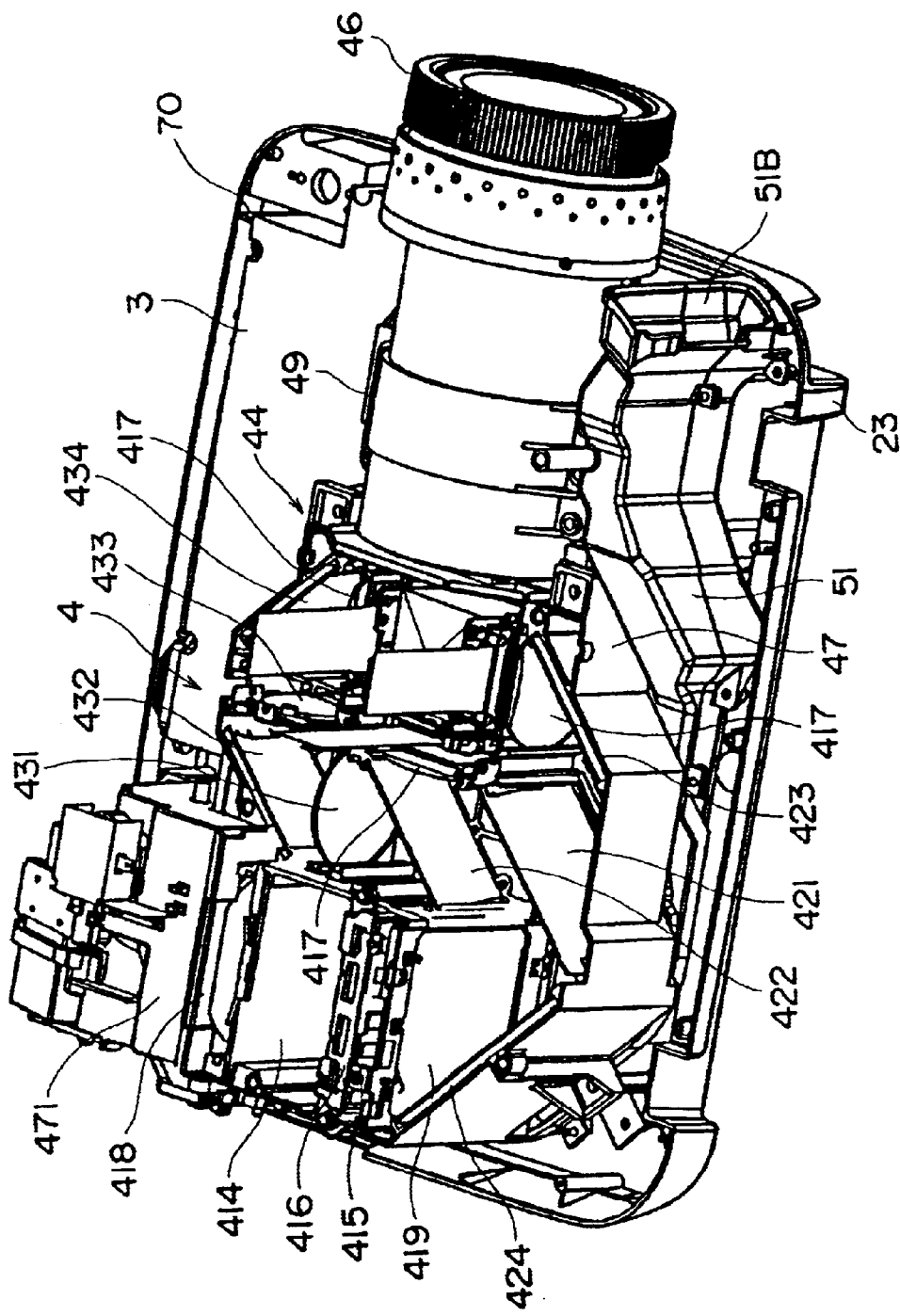
FIG. 5 is a perspective view showing components of the projector of the aforesaid embodiment.

The above-described respective optical systems 41 to 45 are disposed on a lower side of a main board 90 covered with a shield plate 91 as shown in FIGS. 3 and 5 and are accommodated in a inner case 47 as a optical component casing made of synthetic resin.

The inner case 47 is provided with a groove for slidably fitting the respective optical components 414 to 419, 421 to 423 and 431 to 434 from upper direction as well as a light source protector 471 for covering the light source 413.

A head portion 49 is formed on the light-irradiating side of the lower inner case 47. The prism 45 attached with the liquid crystal panels 441R, 441G and 441B is fixed to one end of the head portion 49 and the projector lens 46 is fixed to a flange along semi-cylindrical portion of the other end.

[3. Cooling Mechanism]

In FIGS. 5 to 9, a first cooling system A where the air inhaled by an axial flow suction fan 70 is discharged to the exhaust hole 24A of the lens attachment frame 24 as a part of the exterior case 2 through a sirocco fan 50 as a centrifugal fan and a discharge hole 51B of an exhaust duct 51, a second cooling system B where the cooling air inhaled by a suction fan 71 provided below the optical unit 4 is discharged from the sirocco fan 50 to the exhaust hole 24A of the lens attachment frame 24 through the discharge hole 51B of the exhaust duct 51, and a third cooling system C where the air inhaled by an intake duct 60 formed between an upper side of the sirocco fan 50 and the inner case 47 as a casing is discharged from the sirocco fan 50 to the exhaust hole 24A of the lens attachment frame 24 through the discharge hole 51B of the exhaust duct 51 are formed in the projector 1.

The sirocco fan 50 and the exhaust duct 51 connected thereto will be described below with reference to FIGS. 5 to 7.

The sirocco fan 50 is formed in a flat disk having an air discharge hole 50A extending in tangent line of the outer circumference, which is provided on a bottom of the lower case 23 near the backside of the lower case 23 and shifted in width direction relative to extension of axial line of the projector lens 46. An air intake 50B of the sirocco fan 50 faces upward and an air discharge hole 50A thereof faces to the extension of the axial line of the projector lens 46.

An end 51A of the exhaust duct 51 is connected to the air discharge hole 50A of the sirocco fan 50. The exhaust duct 51 is made of, for instance, synthetic resin, and is provided along two sides, i.e. a backside 232C and a side 232B orthogonal with the backside 232C of the lower case as a casing, which extends toward a neighborhood of the front portion 232A of the lower case 23. The discharge hole 51B is formed on the other end of the exhaust duct 51.

A plurality of bent portions 52 for bending the exhaust flow by the sirocco fan 50 are formed on the exhaust duct 51.

Specifically, the end 51A of the exhaust duct 51 as a connection with the air discharge hole 50A of the sirocco fan 50 has one side extending along the inner surface of the backside portion 232C of the lower case 23. The bottom portion of the end 51A horizontally extends along the bottom of the lower case 23 in a predetermined length and a first bent portion 52A rising at a bending angle of 45 degrees or less toward a corner between the backside 232C and the side 232B continuously extends from the end of the horizontal portion.

A top of the inclination of the first bent portion 52A is planarly bent by approximately 90 degrees from the inside of the backside 232C of the lower case along the side 232B orthogonal with the inside, the bent portion being a second bent portion 52B.

A continuous portion 53 continuing to the second bent portion 52B is provided at a part of the exhaust duct 51 along the side 232B of the lower case 23. A third bent portion 52C rising at a bending angle of 45 degrees or less toward the discharge hole 51B on the other end of the exhaust duct 51 is provided on the exhaust side end of the continuous portion 53.

The cross section of the end 51A and the first bent portion 52A of the exhaust duct 51 extending along the inside of the backside 232C of the lower case 23 and the continuous portion 53 and the third bent portion 52C extending along the side 32B orthogonal with the inside of the backside 232C is arranged so that the width (diameter) of the end 51A and the first bent portion 52A is W1, the width of the continuous portion 53 is W2 narrower than the width W1 and the width of the third bent portion 52C is W3 narrower than the width W2. The height at the respective portions of the width W1, W2 and W3 is the largest at the portion of width W3 and becomes smaller in the order of the widths W2 and W1. However, the area of the cross section stays substantially the same along the entire length of the exhaust duct 51.

In the first cooling system A, the cooling air inhaled from the gap of the lens attachment frame 24, the speaker hole 2C etc. by the axial flow suction fan 70 flows toward and is sucked in by the sirocco fan 50 while cooling the power supply, the lamp driving circuit etc. Then, the cooling air is discharged from the exhaust hole 24A of the lens attachment frame 24 toward the outside of the exterior case 2 through the discharge hole 51B of the exhaust duct 51.

In the second cooling system B, the cooling air inhaled from the suction fan 71 covered with the fan cover 235 provided on the backside of the lower case 23 and attached to the lower side of the inner case 47 flows toward the sirocco fan 50 to be sucked in while cooling the cross dichroic prism 45 and the electric optical device 44. Then, the cooling air is discharged from the exhaust hole 24A of the lens attachment frame 24 toward the outside of the exterior case 2 through the discharge hole 51B of the exhaust duct 51.

Figure 7:
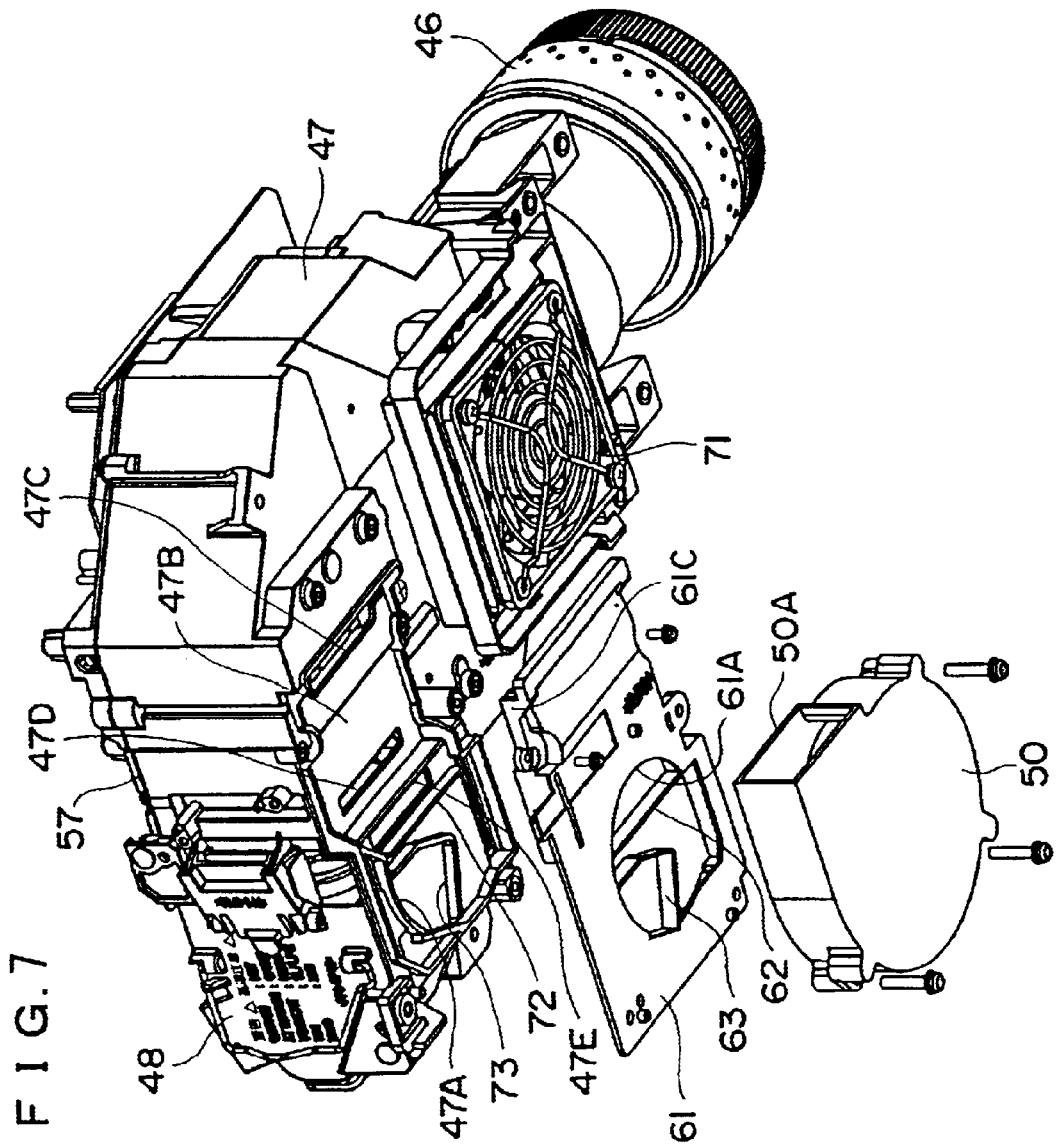
FIG. 7 is a perspective view showing a part of cooling mechanism of the projector of the aforesaid embodiment.
Figure 8:
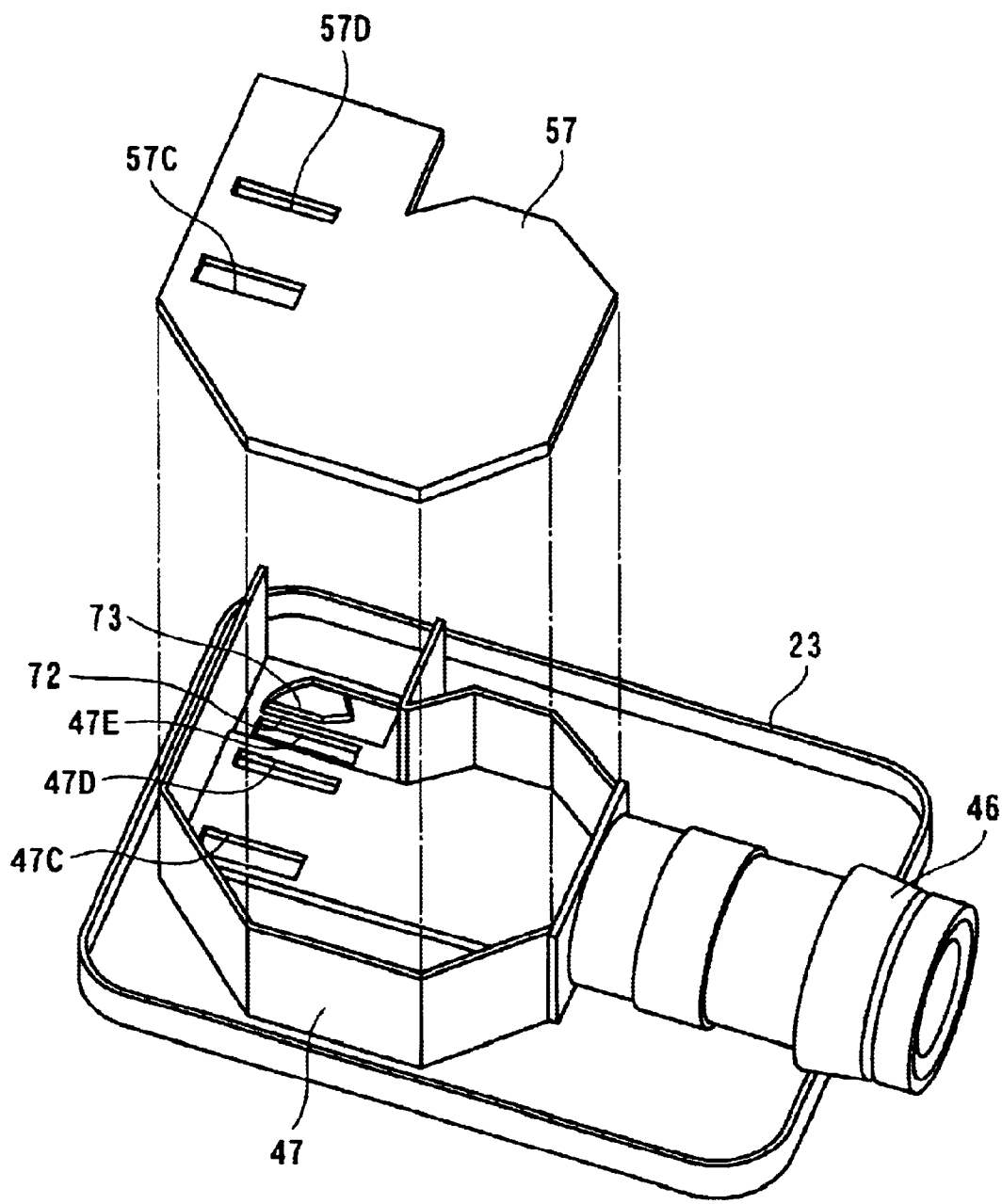
FIG. 8 is a perspective view schematically showing a part of the cooling mechanism of the projector of the aforesaid embodiment.
Figure 9:
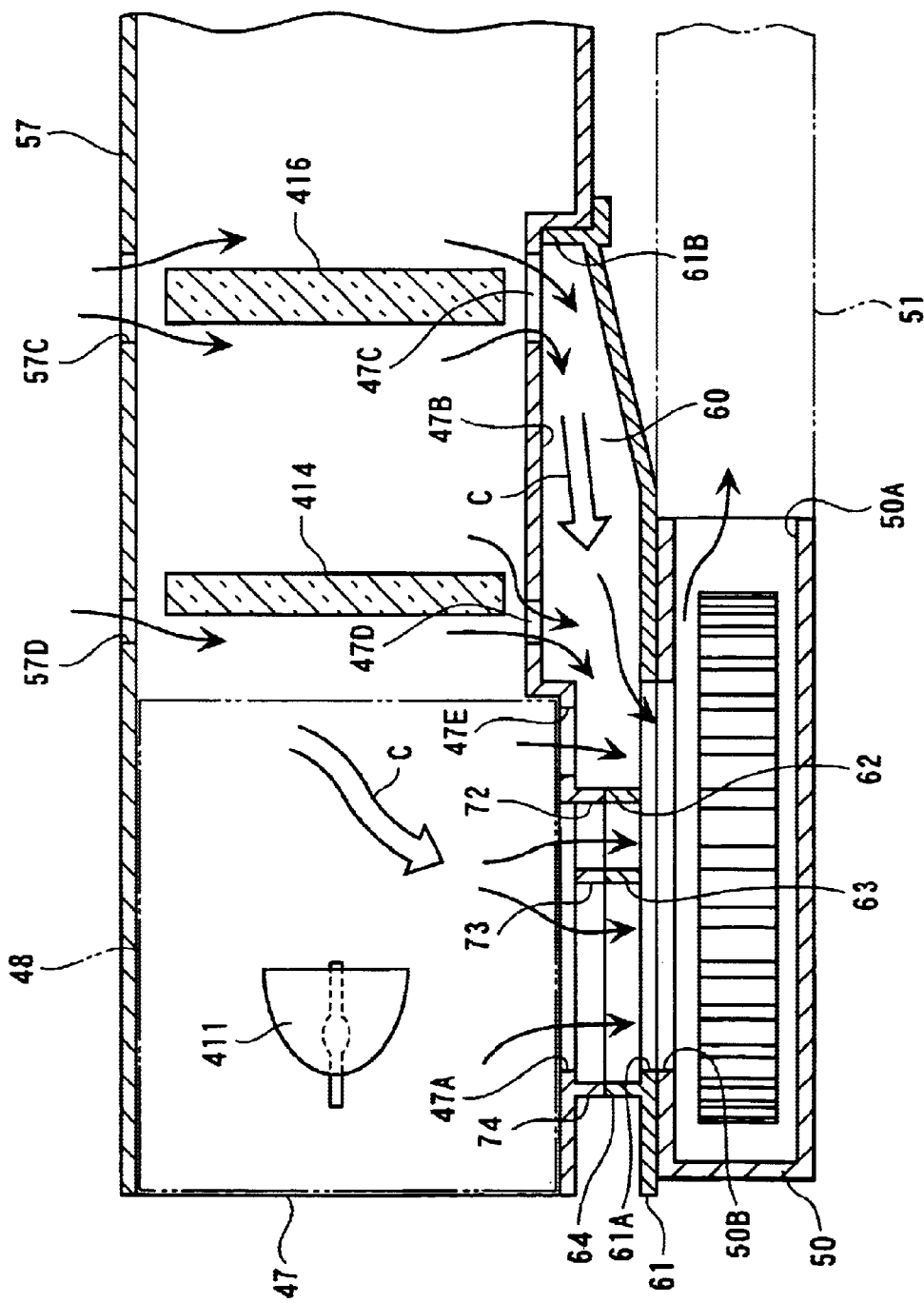
FIG. 9 is a vertical cross section showing a part of the cooling mechanism of the projector of the aforesaid embodiment.

In the third cooling system C, as shown in FIGS. 7 to 9, the cooling air inhaled from the opening adjacent to the attachment of the light source lamp unit 48 of the inner case 47 etc. is sent from the exhaust duct 60 formed between the inner case 47, sirocco fan 50 and the exhaust duct 51 toward the air intake 50B of the sirocco fan 50, and is circulated through the sirocco fan 50 and the exhaust duct 51 to be discharged from the discharge hole 51B of the exhaust duct 51 toward the outside of the projector 1 through the exhaust hole 24A of the lens attachment frame 24.

A lid member 61 is provided at a space forming the intake duct 60 between the inner case 47 and the sirocco fan 50, and the exhaust duct 51. An opening 61A is formed on the lid member 61 corresponding to the air intake 50B of the sirocco fan 50. The lid member 61 is fixed by screwing to the lower side of the inner case 47.

As shown in FIG. 7, a first lower partition member 62 projecting toward the lower side of the inner case 47 spanning over the opening 61A, a second lower partition member 63 as a partition for the light source and an upper frame 64 are integrally formed on the upper side of the lid member 61. The first lower partition member 62 is provided along width direction of the lid member 61. The second lower partition member 63 is formed in approximate L-shape with a part of the side thereof being parallel to the first lower partition member 62.

An end of the lid member 61 on the side of the exhaust duct 51 rises in a gentle inclination and a rising portion 61B is formed on the distal end thereof. A side portion 61C (see FIG. 7) continuing to the rising portion 61B is provided on a part of the upper side of the lid member 61 in succession from the rising portion 61B to the first lower partition member 62, the rising portion 61B and the side portion 61C forming a frame.

A light source lamp unit 48 is detachably attached to a corner of the inner case 47 disposed above the sirocco fan 50 and the exhaust duct 50. The light source lamp unit 48 accommodates the light source lamp 411 etc therein.

On the other hand, a recess 47B is formed on a part of the bottom backside of the inner case 47 and an exhaust opening 47A is formed on the bottom backside continuing from the recess 47B. A first upper partition member 72 projecting toward the lid member 61, a second upper partition member 73 as a light source partition and a lower frame 74 are formed on the bottom backside of the inner case 47. The respective ends of the first upper partition member 72 and the first lower partition member 62, the second upper partition member 73 and the second lower partition member 63, the lower frame 74 and the upper frame 64 respectively contact with each other.

The frame formed by the rising portion 61B and the side portion 61C of the lid member 61 is fitted to a space defined by the recess 47B, the first upper partition member 72 and the first lower partition member 62. Accordingly, the space between the lid member 61 and the inner case 47, in other words, the space between the exhaust duct 51 and the inner case 47 is surrounded by a frame, the space defining the intake duct 60 which continues to the opening 61A of the lid member 61 and the air intake 50B of the sirocco fan 50.

A narrow first lower opening 47C and a second lower opening 47D are formed on the bottom of the inner case 47 with a predetermined interval. A third lower opening 47E is formed between the first upper partition member 72 and the second lower opening 47D.

On the other hand, a first upper opening 57C and a second upper opening 57D corresponding to the first lower opening 47C and the second lower opening 47D are formed on the upper inner case 57.

The light source lamp 411 etc. is disposed above the exhaust opening 47A with being accommodated in the light source lamp unit 48. The first lens array 414 is disposed between the second upper opening 57D and the second lower opening 47D and the second lens array 416 is disposed between the first upper opening 57C and the first lower opening 47C.

The first upper partition member 72 and the first lower partition member 62 guide the after-cooling air from different parts inside the inner case 47 to the air intake 50B of the sirocco fan 50.

The second upper partition member 73 and the second lower partition member 63 guide the after-cooling air from the light-irradiating front side and backside of the light source to the air intake 50B of the sirocco fan 50.

[Effects of the Embodiment]

According to the above-described embodiment, following effect can be obtained.

(1) Since the exhaust hole 24A formed on the lens attachment frame 24 constituting the exterior case 2 and the sirocco fan 50 for exhausting the air are connected through the exhaust duct 51, the sirocco fan 50 for exhausting the air can be located remote from the exhaust hole 24A, so that the noise generated by the projector 1 can be reduced even when the size of the cooling fan is increased.

(2) Since the exhaust air is discharged from the exhaust hole 24A formed on the lens attachment frame 24 through the inside of the exhaust duct 51, the exhaust stream can be prevented from colliding with components of the projector 1, thereby restraining generation of jet noise and improving silence of the projector 1.

(3) Since three bent portions, i.e. the first bent portion 52A, the second bent portion 52B and the third bent portion 52C are formed on the exhaust duct 51, the noise of the exhaust fan can be prevented from being leaked out of the exhaust hole, thereby further improving silence of the projector 1.

(4) Since the sirocco fan 50 is used as the exhausting fan, the air can be discharged with a high discharge pressure, so that the air can be sufficiently discharged even when the length of the exhaust duct 51 from the air discharge hole 50A of the sirocco fan 50 to the exhaust hole 24A of the exterior case 2 is lengthened.

(5) Since the exhaust hole 24A formed on the lens attachment frame 24 is provided on the front side of the projector 1, the hot wind does not blow out from the backside of the projector 1, so that audience observing the projected image of the projector 1 does not feel annoyed.

(6) Since the exterior case 2 is approximate rectangular solid and the exhaust duct 1 extends from the backside of the exterior case 2 along two sides thereof, the exhaust duct 51 can be located on the outer portion of the case and the respective optical components can be efficiently disposed inside the case, thereby improving accommodation efficiency and preventing increase in size of the device.

(7) Since the cross section of the exhaust duct 51 is arranged so that the diameter W1 along the inside of the lower case 23 constituting the exterior case 2 is larger than the diameters W2 and W3 orthogonal therewith and cross section area is substantially the same over the entire length, the exhaust efficiency is not impaired. And since the diameter in one direction is small, the optical components can be disposed at the spare space, thereby improving accommodation efficiency and preventing increase in device size.

(8) Since the bending angle of the first bent portion 52A and the third bent portion 52C of the exhaust duct 51 is 45 degrees or less, turbulence can be restrained and the exhaust stream can smoothly flow.

(9) Since the exhaust duct 51 is disposed along the inner case 47 and an intake duct 60 for introducing the cooling air for the optical components inside the inner case 47 toward the air intake 50B of the sirocco fan 50 is formed between the inner case 47 and the exhaust duct 51, the after-cooling air of the portion where the heat is the most likely to be accumulated can be guided to the air intake 50B of the sirocco fan 50, thereby improving exhaust efficiency.

(10) Since the exhaust opening 47A is formed on the inner case 47, the sirocco fan 50 is disposed so that the air intake 50B faces the exhaust opening 47A and the first upper partition member 72 and the first lower partition member 62 are formed on the exhaust opening 47A, the after-cooling air of different portions in the inner case 47 can be securely guided to the air intake 50B of the sirocco fan 50 by the respective partitions 72 and 62.

(11) Since the second upper partition member 73 and the second lower partition member 63 are formed on the exhaust opening 47A, the after-cooling air from the light-irradiating side and backside of the light source can be securely introduced to the air intake 50B of the sirocco fan 50 by the respective partition members 73 and 63.

(12) Since the intake duct 60 is formed by combining the recess 47B formed on the outside of the inner case 47 and the lid member 61 shutting the recess 47B and the lid member 61, the lower partition member 62, and the second lower partition member 63 are integrated, the lid member 61 and the partition members 62 and 63 do not have to be manufactured as separate components, thereby omitting work and components required therefor.

(13) Since the portion toward the rising portion 61B of the lid member 61 constituting the intake duct 60 is formed in a gentle inclination, the air flow from the first opening 47C of the inner case 47 toward the air intake 50B of the sirocco fan 50 can be made smooth.

[Modifications]

Incidentally, the scope of the present invention is not limited to the above embodiment, but includes modification and improvements as long as an object of the present invention can be achieved.

For instance, though three bent portions 52, i.e. the first bent portion 52A, the second bent portion 52B and the third bent portion 52C, are formed on the exhaust duct 51. However, the third bent portion 52C may be omitted and the exhaust duct 51 may be continued at the height of the second bent portion 52B.

Though the sirocco fan 50 and the exhaust duct 51 are attached to the lower case 23 to extend along the backside 232C and the side 232B, the sirocco fan 50 and the exhaust duct 51 may be provided to the upper case 21. In this case, the exhaust duct may be provided on the downward inclination and the exhaust hole may be provided to a position lower than the height of the sirocco fan.

Though a projector using three optical modulators is taken as an example in the above-described embodiment, the present invention may be applied to a projector having only one optical modulator, a projector having two optical modulators, and a projector having more than three optical modulators.

Though a liquid crystal panel is used as the optical modulator, an optical modulator other than the liquid crystal such as a device using a micro-mirror may be used.

Further, though a transmitting optical modulator having different light-incident side and light-irradiating side, a reflecting optical modulator having the common light-incident side and light-irradiating side.

Further, though a front-type projector for projecting from a direction for observing the screen is taken as an example in the above-described embodiment, the present invention may be applied to a rear-type projector for projecting onto the screen from an opposite side to be observed.

What is claimed is:

1. A projector, comprising:
    a light source;
    an electric optical device that modulates a light irradiated from the light source in accordance with an image information to form an optical image;
    a projecting optical system that enlarges and projects the optical image formed by the electric optical device;
    a casing having a side, the casing accommodates the light source, the electric optical device and the projecting optical system;
    a centrifugal fan disposed around the light source that draws in air by rotation thereof and discharges the air in a tangential direction to the rotation;
    an exhaust duct accommodated in the casing, the exhaust duct having a first end connected to an air discharge hole of the centrifugal fan and a second end connected to an exhaust hole formed at the front of the casing where the projecting optical system is exposed; and
    at least one bent portion formed on the exhaust duct to bend an exhaust stream discharged from the centrifugal fan, wherein the at least one bent portion changes the direction of the exhaust stream by approximately ninety degrees relative to the direction of the exhaust stream at the air discharge hole of the centrifugal fan; and
    wherein the cross-sectional area of the exhaust duct is substantially constant.

2. The projector according to claim 1, wherein the casing is approximately rectangular solid, and wherein the exhaust duct extends along at least two sides of the inside of the casing.

3. The projector according to claim 1, wherein the cross section of the exhaust duct has a larger diameter along the side of the casing than the diameter in a direction orthogonal with the side of the casing.

4. The projector according to claim 3, wherein the side is one of a lateral side, rear side and bottom side.

5. The projector according to claim 1, wherein the at least one bent portion comprises a plurality of bent portions, and the bending angle of a bent portion among the plurality of bent portions is 45 degrees or less.

6. The projector according to claim 1, further comprising an optical component case that accommodates optical components including the light source, the exhaust duct being disposed along the optical component case, and an intake duct provided between the optical component case and the exhaust duct to introduce components inside the optical component case to an air intake of the centrifugal fan.

7. The projector according to claim 6, wherein an opening that introduces the cooling air is formed on a side of the optical component case opposite to a side along with the intake duct is provided, and a disposition of the opening corresponds to a disposition of the optical components accommodated in the optical component case.

8. The projector according to claim 6, wherein an exhaust opening that discharges the air having cooled the optical components is formed on the optical component case, a disposition of the exhaust opening corresponds to a disposition of the light source accommodated therein,
    the centrifugal fan is disposed on the exhaust opening with the air intake of the centrifugal fan facing upward, and
    a partition member is provided that divides an after-cooling air transferred from the light source and an after-cooling air transferred from the other optical components to the exhaust opening.

9. The projector according to claim 8, wherein a light source partition is provided that divides the after-cooling air transferred from a light-irradiating side of the light source and the after-cooling air transferred from the backside of the light source to the exhaust opening.

10. The projector according to claim 9, wherein the intake duct is constructed by combining a recess formed on the outside of the optical component case and a lid member shutting the recess, the lid member and the partition member being integrated.

* * * * *